F. A. STEVENS.
EYEGLASSES AND SPECTACLES.
APPLICATION FILED JAN. 12, 1916.

1,177,367.

Patented Mar. 28, 1916.

Inventor.
Frederick A. Stevens
By Horatio E. Bellows
Attorney.

UNITED STATES PATENT OFFICE.

FREDERICK A. STEVENS, OF PROVIDENCE, RHODE ISLAND, ASSIGNOR TO STEVENS AND COMPANY, INCORPORATED, A CORPORATION OF RHODE ISLAND.

EYEGLASSES AND SPECTACLES.

1,177,367.  Specification of Letters Patent.  Patented Mar. 28, 1916.

Application filed January 12, 1916. Serial No. 71,849.

*To all whom it may concern:*

Be it known that I, FREDERICK A. STEVENS, a citizen of the United States, residing at Providence, in the county of Providence and State of Rhode Island, have invented certain new and useful Improvements in Eyeglasses and Spectacles, of which the following is a specification.

My invention relates to eyeglasses and spectacles including shooting glasses, and particularly to the lens holding or retaining means thereof.

Non-metallic rims for lenses have heretofore been used in eyeglasses and spectacles because of certain advantages including popularity, but their frangibility and susceptibility to fracture under shock and strain has limited their use.

The essential objects of my invention are to overcome this deficiency; to impart a maximum of strength to the portions of the structure between bridge and end pieces and elsewhere; to give especial prominence to the non-metallic holding rim as viewed by an observer; to avoid unsightly, ineffective, and laborious connections such as screws and rivets now required to connect non-metallic rims to bridges and end pieces; to insure a perfect fit of the lenses in the non-metallic holding rims which is now impossible and involves in the attempt a heating and stretching of the material in the rims.

To the above ends essentially my invention consists in such parts and combinations of parts as form the subject matter of the appended claims.

Figure 1:
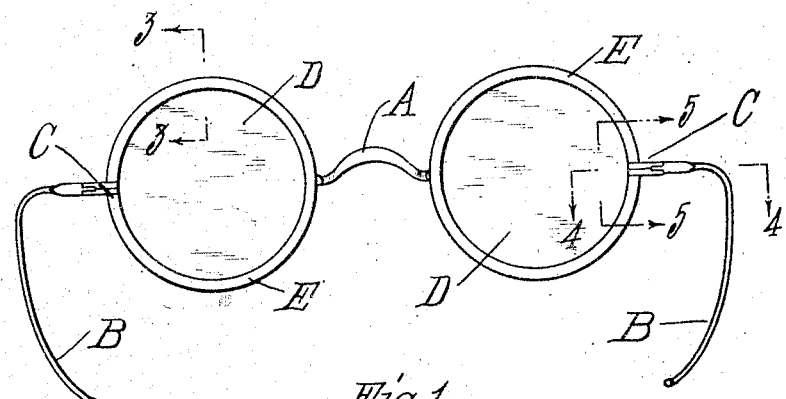
Figure 2:
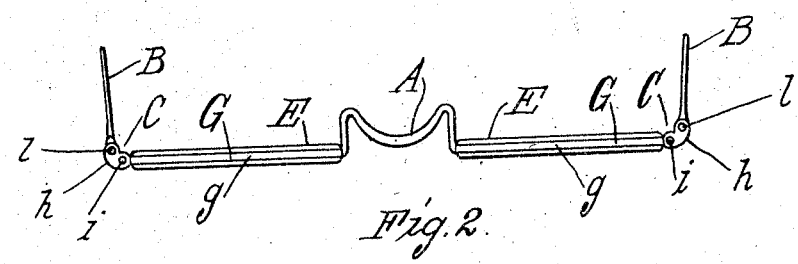
Figures 3, 4:
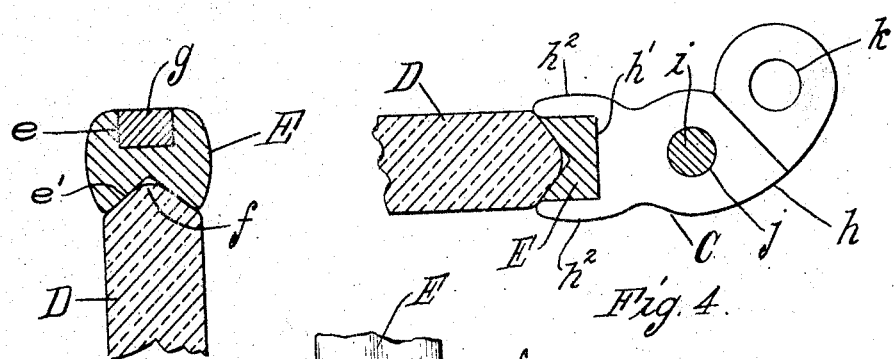
Figure 5:
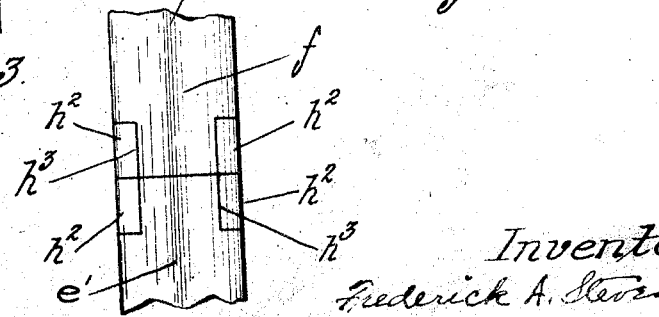

In the accompanying drawings which form a part of this specification, Figures 1 and 2 are front and plan elevations respectively of a pair of spectacles embodying my invention, and Figs. 3, 4, and 5, sections on lines 3—3, 4—4, and 5—5 respectively of Fig. 1.

Like reference characters indicate like parts throughout the views.

A, B and C represent in a general way the bridge, temples and end pieces of the spectacles shown, and D represents the lenses. Each lens is inclosed by a rim E of horn, tortoise shell, celluloid, or other non-metallic material, provided with an outer or peripheral channel $e$, and an annular V-shaped groove $e'$ in its inner surface. A V-shaped or rounded peripheral projection $f$ on the lens registers in the groove. The rim is transversely split or jointed to permit the insertion of the lens into its seat.

Integral with the bridge is the usual metal rim G comprising the pairs of arched rim sections $g$, terminating in the ears $h$ which, when joined together constitute end pieces C. Each ear is rectangularly recessed as at $h'$ to receive the rim E, and producing bracing portions $h^2$ which register in lateral recesses $h^3$ in the ends of said rim. The rim sections $g$ are closed toward each other, entering the channels $e$, and the members $h$ of the end pieces C are then bound together in the usual manner by the screw $i$ passing through the perforations $j$. Perforations $k$ in the ends of the members $h$ receive the pintle $l$ of the temple B in the usual manner, when the structure is a pair of spectacles.

The described construction and assemblage of the members E and G avoids any necessity of heating or stretching the former member, and the metallic rim is inconspicuous, while the security of the lens and the holding rim is enhanced. A maximum of strength also is present in the holding rim because of the reinforcing character of the metallic rim which embraces and clamps the same. No retaining rivets or screws are required to connect the holding rim to the bridge or end pieces.

Other modes of applying the principle of my invention may be employed instead of the one explained, change being made as regards the elements herein disclosed provided the means stated by any of the following claims or the equivalent of such stated means be employed. The description of the structure has been given in detail merely for the clearness of understanding, and no undue limitation should be understood therefrom. The area of the member E is herein shown as limited and of strictly annular form, but this area and form are obviously not exclusive, nor is the detailed location and construction of either the bridge or the end pieces material to the present invention.

I claim:—

1. In eyeglasses or spectacles, the combination with the bridge and end pieces, of metallic rims connecting the bridge and end pieces, and non-metallic rims embraced by the metallic rims, and lenses embraced by the non-metallic rims.

2. In eyeglasses or spectacles, the combination with the lenses, of non-metallic rims surrounding the lenses and provided with grooves adapted to receive the edges of the lenses and provided with peripheral channels, and metallic rims surrounding the first rims and seated in the channels.

3. In eyeglasses or spectacles, the combination with the bridge, of metallic rim sections, means for connecting the ends of the rim sections, transversely split non-metallic rims embraced by the rim sections, and lenses embraced by the split rims.

4. In eyeglasses or spectacles, the combination with the lenses, of transversely split non-metallic rims engaging the lenses and provided with recesses, metallic rim sections embracing the rims, members upon the adjacent ends of the sections, means for connecting the members to form end pieces, and extensions on said members registering in the recesses.

In testimony whereof I have affixed my signature.

FREDERICK A. STEVENS.